Feb. 1, 1938.     T. C. MOORSHEAD     2,106,899
MEANS FOR FEEDING GLASS TO GLASS FORMING MACHINES
Filed Feb. 5, 1936     5 Sheets-Sheet 1

INVENTOR
THOMAS COURTNEY MOORSHEAD
BY
McConkey & Booth
ATTORNEYS

Feb. 1, 1938. T. C. MOORSHEAD 2,106,899
MEANS FOR FEEDING GLASS TO GLASS FORMING MACHINES
Filed Feb. 5, 1936 5 Sheets-Sheet 2

INVENTOR
THOMAS COURTNEY MOORSHEAD
BY
McConkey & Booth
ATTORNEYS

Feb. 1, 1938. T. C. MOORSHEAD 2,106,899
MEANS FOR FEEDING GLASS TO GLASS FORMING MACHINES
Filed Feb. 5, 1936 5 Sheets-Sheet 3

INVENTOR
THOMAS COURTNEY MOORSHEAD
BY
McConkey & Booth
ATTORNEYS

Patented Feb. 1, 1938

2,106,899

UNITED STATES PATENT OFFICE 2,106,899

MEANS FOR FEEDING GLASS TO GLASS FORMING MACHINES

Thomas Courtney Moorshead, Strand, London, England, assignor to The United Glass Bottle Manufacturers Limited, London, England, a British company Application February 5, 1936, Serial No. 62,389
In Great Britain January 8, 1936

19 Claims. (Cl. 49—62)

This invention relates to means for feeding gobs of molten glass from a furnace forehearth or the like to the moulds of a glass shaping machine and has particular reference to means of the type in which the glass is drawn upwardly into a gathering cup and afterwards discharged from the latter into the mould.

One of the objects of the present invention is to provide an improved form of glass feeding means of the above mentioned type by which the path of movement of the gathering cup from its charging to its discharging position is made relatively short so as to avoid chilling of the glass.

According to one feature of the invention the improved feeding means comprises a forehearth extending outwardly from a glass furnace and a gathering cup arranged for a limited movement relatively thereto between a charging and a discharging position, the arrangement being such that the cup, after being lowered into the gathering position in the forehearth, is adapted to be raised and moved laterally to one side of the forehearth and is thereupon discharged.

According to another feature of the invention the improved feeding means comprises a pair of forehearths extending outwardly from a glass furnace and a pair of gathering cups co-operating therewith so that one is in a gathering position at one forehearth whilst the other is discharging and, during the discharging of the former, the latter is gathering at the other forehearth.

In order that the said invention may be clearly understood and readily carried into effect the same will now be more fully described with reference to the accompanying drawings in which:—

Figure 1:
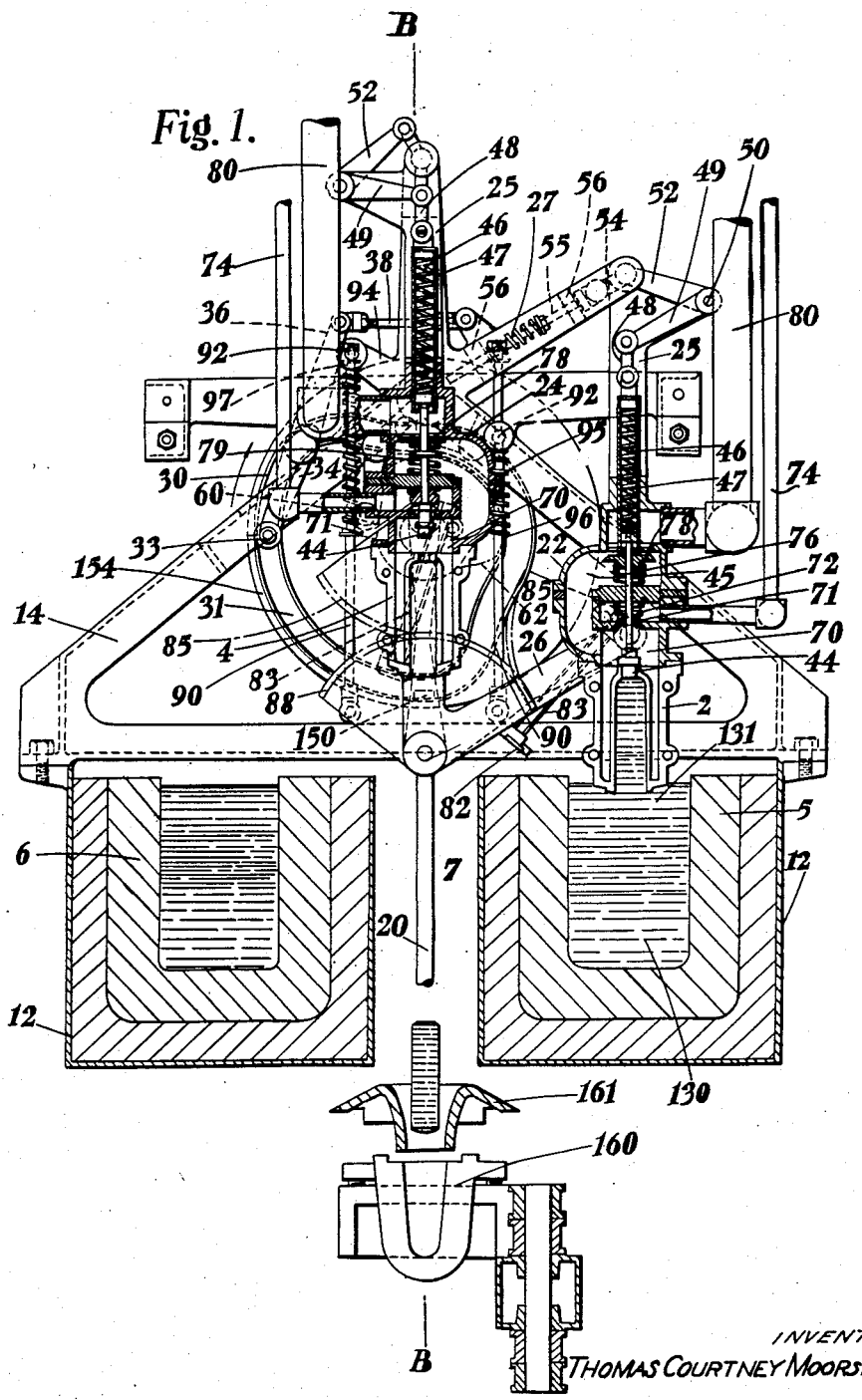
Fig. 1 is a vertical sectional view through a feeding means produced in accordance with the invention, the section being taken on the line A—A of Fig. 2.

As will be seen from Fig. 1, the feeder illustrated is a twin feeder having two gathering cups 2 and 4 adapted to be raised and lowered alternately so as to gather glass from a pair of refractory boots or gathering forehearths 5 and 6 which are disposed parallel with one another so that a space 7 is provided therebetween. The forehearths extend outwardly from the furnace and are housed and insulated in iron casings 12. Over the forehearths and suitably supported by the casings 12 are arranged brackets 14 by which the mechanism for raising and lowering the gathering cups is carried, said brackets having journalled therein a horizontal shaft 15 disposed over the space 7 and adapted to be driven synchronously with the glass forming machine through bevel gears 17 and 18 and a vertical driving shaft 20 extending upwardly through the space 7.

Each gathering cup is made up of two-half portions suitably bolted together and formed with vacuum grooves of known form, the whole being clamped to the underside of a gathering head, it being appreciated that the dimensions of the gathering cup will depend upon the type and upon the dimensions of the moulds to be supplied with glass.

Figure 4:
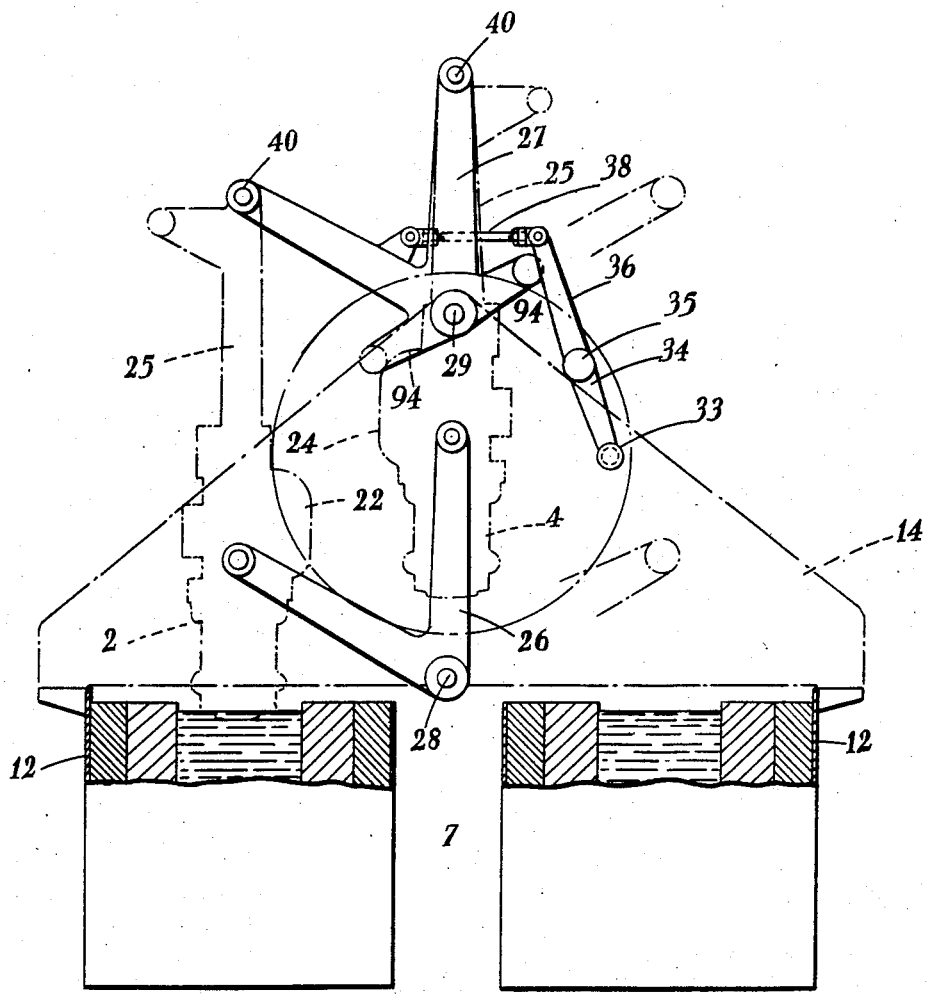
Figs. 4 and 5 are fragmentary detail views with certain parts omitted, taken on the lines D—D and E—E respectively of Fig. 2.
Figure 5:
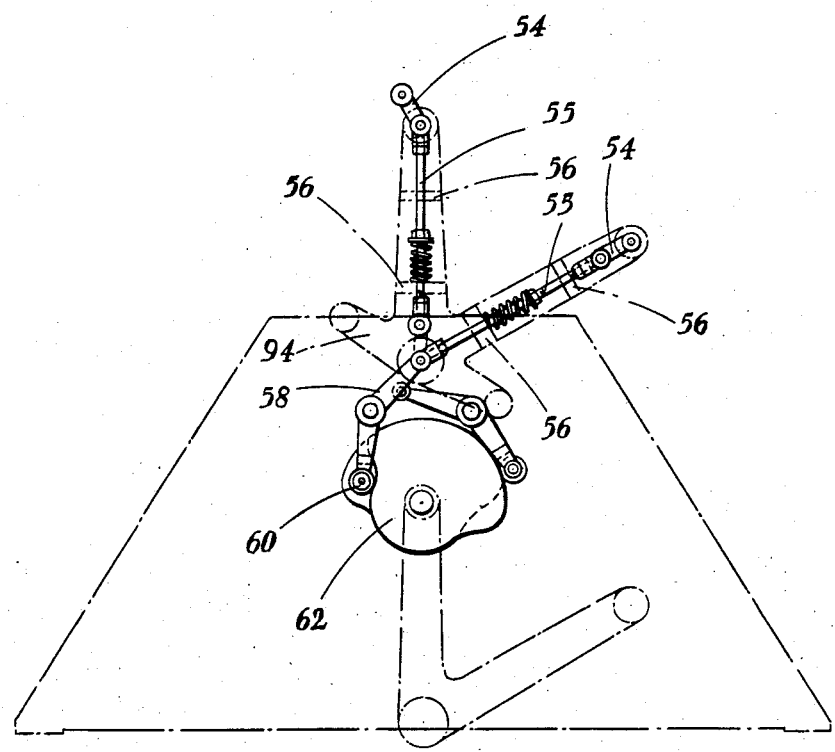

The gathering heads are indicated at 22 and 24 and each is formed with an upwardly extending portion 25, said heads being carried by a pair of parallel bell-crank levers 26 and 27 (Fig. 4) which are arranged for movement about a pair of horizontally disposed pivots 28 and 29 which are located in a vertical plane passing through the horizontal shaft 15 and midway through the space 7. The two arms of each of the bell-crank levers are formed so that they subtend an angle of approximately 60° and the units formed by the gathering heads and their upwardly extending portions 25 are supported by the said arms so that they form a pair of rigid vertically disposed links between the outer ends of each pair of parallel arms of the bell-crank levers, the arrangement being such that, when one gathering head is in a raised position over the space 7, the other is in a lowered position with its gathering cup ready to gather glass from one of the gathering forehearths. Thus, it will be seen that, by oscillating the two bell-crank levers 26 and 27 through an angle of approximately 60°, each gathering cup will be alternately raised and lowered and, at the same time, moved laterally between a position over a gathering forehearth and a position over the space between the forehearths.

The means for oscillating the bell-crank levers in the manner indicated above comprise a cam plate 30 carried by the continuously rotating shaft 15 and formed with a cam groove 31 in which is arranged a cam roller 33 mounted upon one end of an arm 34 forming part of a two-armed lever which is pivotally mounted at 35. The other arm 36 of the said lever is arranged in a different plane from that of the arm 34 and its free end is coupled with one of the arms of the upper bell-crank lever 27 by a short connecting rod 38 the length of which is preferably adjustable. The cam groove is shaped so that each gathering cup is allowed to remain stationary in each of the positions into which it is moved for an appropriate period of time and it will be appreciated that each time one of the gathering cups is moved laterally from its position over the forehearth with which it co-operates into its raised or discharging position over the space 7, the other gathering cup will be moved laterally from the last mentioned position into a position over the other forehearth.

Figure 2:
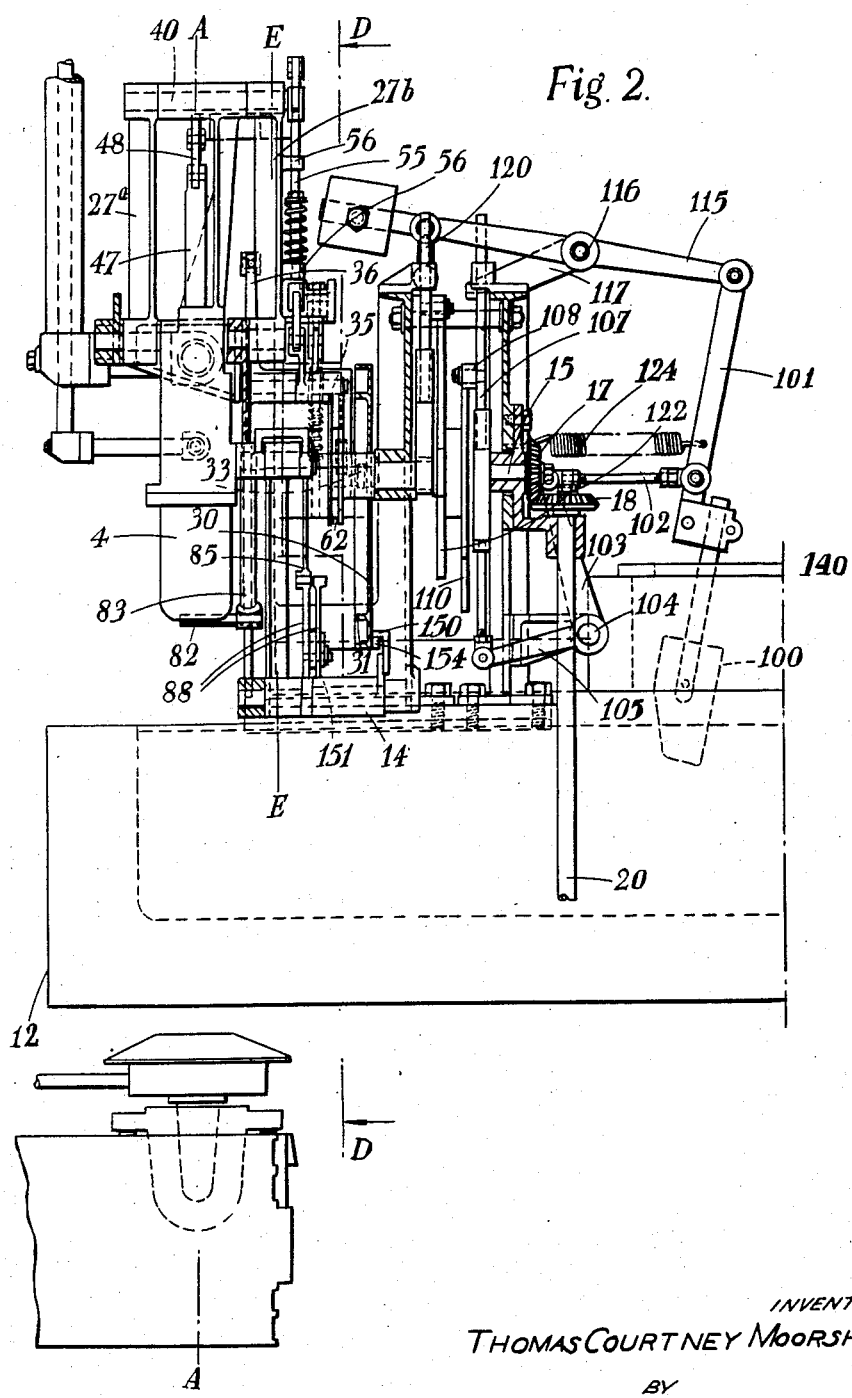
Fig. 2 is a vertical sectional elevation taken on the line B—B of Fig. 1.
Figure 3:
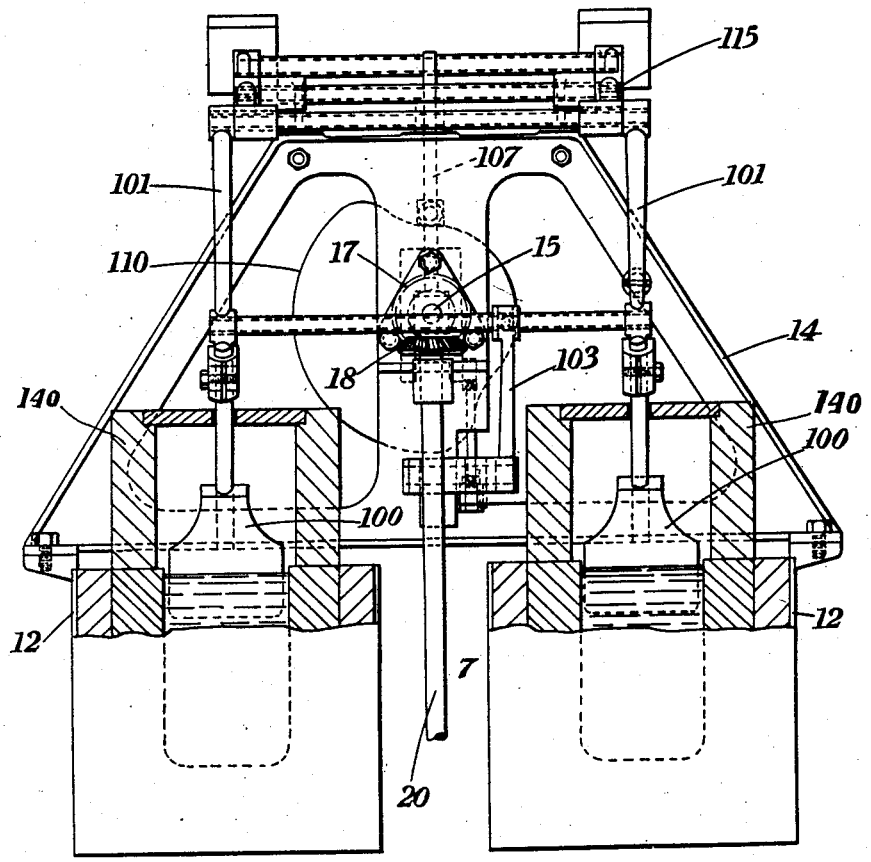
Fig. 3 is a vertical sectional view looking from the right of Fig. 2.

As the gathering cups, the gathering heads and other parts associated therewith are of considerable weight, it is inadvisable to support the aforesaid vertically disposed units from horizontally disposed spindles extending laterally cantilever fashion from the bell-crank levers. Preferably, therefore, the upper bell-crank lever 27 is made up of two similar vertically disposed bell-crank units such as are indicated at 27a and 27b in Fig. 2, said units being spaced apart and arranged one behind the other with their upper ends inter-connected by two horizontally disposed spindles 40 so that the units move together as one about the pivot 29. Also, the upper ends of the members 25 are each pivotally supported on one of the spindles 40.

Each gathering cup is preferably formed at its upper end with an opening for the reception of a sealing plunger 44 which is adapted to be raised and lowered. For this purpose, the sealing plunger is provided with a stem 45 extending upwardly through the gathering head so that the upper end thereof bears against a spring 46 housed within a tube 47 which is slidably mounted in the gathering head and the upper end of which is connected by a short link 48 with one arm 49 of a bell-crank lever pivoted at 50 in a lateral extension of the member 25. The other arm 52 of the bell-crank lever is coupled by a short link 54 with one end of a connecting rod 55 which is mounted so as to be capable of endwise movement in a pair of brackets 56 formed on the side of the bell-crank lever 27 and the opposite end of the connecting rod is connected with a cam lever 58 having a cam roller 60 engaging one of a pair of sealing plunger actuating cams 62 mounted upon the end of the continuously rotating shaft 15.

Also, each gathering head is formed with a chamber 70 adopted to be connected, at the appropriate times with a source of suction or vacuum and with a source of pressure, e. g. compressed air. For this purpose, the upper wall of the chamber is provided with an opening in which is seated a compressed air valve 71 normally held on its seating by a spring 72 but adapted, when lifted off its seating by a projection on the sealing plunger stem, to place the chamber 70 and the interior of the gathering cup disposed therebeneath in communication with a pipe line 74 connected with a source of compressed air. In addition, the chamber 70 is formed with a side wall opening leading to another chamber 76 the upper wall of which is provided with an opening in which is seated a vacuum valve 78 normally held on its seating by a spring 79 but adapted, when moved downwardly off its seating by the lower end of the tube 47, to place the chambers 76 and 70 and the interior of the gathering cup disposed there-beneath in communication with a pipe line 80 connected with a source of vacuum.

The feeder is also equipped with a pair of cut-off or shearing knives 82 each carried by one of a pair of arms 83 of adjustable length carried by a pair of toothed sectors 85 pivotally mounted one on each of the gathering heads. Said toothed sectors each mesh with one of a pair of toothed sectors 88 arranged side by side for movement about the pivot 28 and to each of the latter sectors is secured the lower end of one of a pair of connecting rods 90 which extend upwardly and are held at or near their upper ends in gudgeon pins 92 carried by extension arms 94 of the bell-crank lever 27. Around each connecting rod is a spring 95 interposed between a collar 96 formed on the connecting rod and another collar 97 formed on the gudgeon pin.

Means are also preferably provided for ensuring the proper circulation of the glass in each of the forehearths and, for this purpose, each forehearth is equipped with a glass circulating paddle 100 supported by a lever 101 adapted to be oscillated by a connecting rod 102 coupling the lever with one arm 103 of a bell-crank lever which is pivotally mounted at 104 and the other arm 105 of which is connected with a vertically movable cam slide 107 provided with a roller 108 bearing against the edge of a cam 110 carried by the continuously rotating shaft 15. The paddles, in addition to being oscillated, are preferably raised and lowered, these movements being combined with the oscillatory movements so that the paddles are caused to move in a more or less elliptical path in such a way that they dip into and out of the glass and propel the same along the forehearth in the desired direction. In the arrangement shown, the levers 101 are pivotally attached at their upper ends to a pair of counterweighted levers 115 pivotally mounted at 116 in brackets 117, said counterweighted levers also being connected with the upper end of a vertically movable cam slide 120 co-operating with another cam 122 carried by the continuously rotating shaft 15 and the levers 101 being yieldingly held in the inclined position shown in Fig. 2 by a spring 124. If desired, paddle housing blocks 140 may be fitted around the paddles.

Preferably the paddles 100 dip into the glass toward the outer ends of the forehearths and move toward the furnace to propel the glass at the surface of the forehearths back into the furnace for reheating, hot glass from the furnace flowing into the forehearths at the bottom thereof to replace the glass displaced by the paddles. At the ends of their strokes nearest the furnace, the paddles will be raised out of the glass and moved back toward the ends of the forehearths. It will be apparent that the effective stroke of the paddles could be reversed if desired to propel hot glass from the furnace out at the upper parts of the forehearths, in which case the cooled glass in the forehearths would flow back to the furnace at the bottoms thereof, the paddles in either case serving to maintain a substantially continuous circulation of hot glass from the furnace through the forehearths.

In operation, each of the gathering cups 2 and 4 is alternately raised and lowered so that one, e. g. the cup 2, moves back and forth between a gathering position over the forehearth 5 and a discharging position over the space 7 while the other moves back and forth between a gathering position, over the other forehearth 6 and the discharging position, the movements being brought about by the continuously rotating cam 31, cam roller 33, lever 36, connecting rod 38 and bellcrank levers 26 and 27, the cam being formed to provide appropriate dwell periods in each position and the arrangement being such that one cup is at rest in the discharging position whilst the other is at rest in the gathering position. During movement of a cup from its discharging to its charging position, a projection 150 carried by a sleeve 151 to which the sectors 88 are secured, is brought into contact with a trigger cam 154 mounted on the continuously rotating cam plate 30 and thereby holds the sectors 88 and connecting rods 90 against movement. Consequently, owing to the continued movement of the bell-crank levers 26 and 27 and of the extension arms 94 formed on the latter, the spring 95 which is interposed between the arm 94 and the collar 96 is compressed and the sector 85 and the knife arm 83 partake of a planetary movement around the periphery of the sector 88 to bring the knife 82 into a cutting position. At or near the time at which a cup is brought into its gathering position, the sealing plunger 44 of the cup is pressed down into the position shown at the right hand side of Fig. 1 by the action of one of the cams 62, cam roller 60, cam lever 58, connecting rod 55, bell-crank lever 49, 52 and spring 46, and by the downward movement of the tube or spring housing 47 the vacuum valve 78 is opened against the spring 79 to establish communication between the source of vacuum and the interior of the gathering cup via the chambers 70 and 76 and the vacuum grooves formed in the cup. As the result, a charge of glass is drawn upwardly to fill the lowered gathering cup. By this time, the cam groove 31 has arrived at a position at which it functions through cam roller 33, lever 36, connecting rod 38 and bell-crank levers 26 and 27, to raise the filled gathering cup from its forehearth and to lower the empty gathering cup into the other forehearth. At a predetermined point in this movement, the trigger cam 154 operates to release the sector 88 and the compressed spring 95 with the result that the sectors 88 and 85 are actuated by the spring rapidly to swing the knife 82 across the lower end of the filled gathering cup, thus severing the glass hanging from the underside thereof. The knife is brought to rest in a position on the opposite side of the gathering cup, which position is controlled by a stop nut on the upper end of the connecting rod 90, and it remains in this position throughout the remaining part of the upward movement of the filled gathering cup.

As soon as the filled gathering cup has been brought to rest in its upper or discharging position, the sealing plunger 44 is raised by the action of one of the cams 62, cam roller 60, cam lever 58, connecting rod 55, bell-crank lever 49, 52 and tube 47 into the position shown at the central part of Fig. 1 and, by this movement, a collar or projection on the sealing plunger stem is caused to lift the compressed air valve 71 off its seating in opposition to its spring and thereby to establish communication between the chamber 70 and the source of compressed air via the pipe line 74. As the result, the charge of glass is forcibly ejected from the gathering cup and falls through the space 7 into the mould 160 of a glass forming machine disposed therebeneath. The machine may be of the continuous or intermittent rotary type and the movements of the moulds are timed so that each arrives in position at the same time as a gathering cup is discharging. If desired, the gob may be guided into the mould by a guide cup 161. Whilst the one gathering cup is being discharged the other will be filled ready for movement into the discharging position as the emptied cup moves away therefrom.

In synchronism with the movements of the gathering cups, the glass circulating paddles 100 are operated by the cams 110 and 122 to maintain a continuous circulation of hot glass through each of the forehearths and to remove from the gathering zones and to return to the furnace for reheating any chilled cut-off glass.

Having thus described this invention, what I claim as new therein and desire to secure by Letters Patent is:—

1. In glass feeding means, operating mechanism comprising a pair of parallel bell-crank levers arranged one over the other for movement about horizontal axes, means interconnecting the free ends of the parallel bell-crank levers, means to swing said levers about the horizontal axes, and a pair of gathering cups carried by the means interconnecting the free ends of said levers.

2. In glass feeding means, operating mechanism comprising a pair of parallel bell-crank levers arranged one over the other for movement about horizontal axes, a pair of vertically disposed units interconnecting the free ends of the bell-crank levers, means to swing said levers about the horizontal axes, a gathering head carried by each of the said vertically disposed units and a gathering cup depending from each gathering head.

3. Means for feeding charges of glass to glass forming machines comprising a pair of parallel furnace forehearths having a space therebetween, a pair of parallel bell-crank levers arranged one over the other for movement about horizontal pivots disposed over said space, a pair of vertically disposed units interconnecting the free ends of the bell-crank levers, a gathering cup depending from each of the vertically disposed units and means for swinging the bell-crank levers about their horizontal pivots to move the gathering cups into gathering positions over said forehearths respectively or into a discharging position over said space.

4. Means for feeding charges of glass to glass forming machines comprising a pair of parallel furnace forehearths, a pair of parallel bell-crank levers arranged for movement about two vertically spaced and horizontally disposed pivots located above the forehearths, each bell-crank lever comprising two arms disposed at an acute angle to one another, means for oscillating the levers in unison between two limiting positions at each of which one arm of one lever and the corresponding arm of the other lever are vertically disposed, and a pair of gathering cups carried one by each of the arms of the lower bell-crank lever, said gathering cups being moved by oscillation of the levers into gathering positions over said forehearths respectively or into a discharging position out of register with both forehearths.

5. Means for feeding charges of glass to glass forming machines comprising a pair of parallel furnace forehearths having a space therebetween, levers mounted over the forehearths, a pair of gathering cups supported by the said levers and means for moving the levers and the cups selectively to one or the other of two limiting positions in one of which one cup is in a gathering position at one forehearth while the other is at a discharging position over the said space while, in the other limiting position, the latter cup is in a gathering position at the other forehearth and the former cup is at the said discharging position.

6. Means for feeding charges of glass to glass forming machines comprising a pair of parallel furnace forehearths, levers mounted over the forehearths, a pair of gathering cups supported by the said levers and a continuously rotating cam for oscillating the levers between two limiting positions at each of which one cup is in a discharging position out of register with both forehearths while the other is in a charging position over one or the other of the forehearths.

7. Means for feeding charges of glass to glass forming machines comprising a pair of parallel furnace forehearths, levers mounted over the forehearths, a pair of gathering cups supported by the said levers and a gathering head connected to each of the gathering cups, said gathering heads being equipped with suction and pressure valves for alternately placing the interiors of the cups in communication with a source of suction and a source of pressure and means for oscillating said levers to move the gathering cups into charging positions over said forehearths respectively or into a discharging position out of register with both forehearths.

8. Means for feeding charges of glass to glass forming machines comprising a pair of parallel furnace forehearths, levers mounted over the forehearths, a pair of gathering cups supported by the said levers, means for operating the levers to move the cups between charging portions over said forehearths respectively and discharging positions out of register with both forehearths, each gathering cup being equipped with a sealing plunger and means for raising and lowering the plunger.

9. Means for feeding charges of glass to glass forming machines comprising a pair of parallel furnace forehearths, having a space therebetween, levers mounted over the forehearths, a pair of gathering cups supported by the said levers, means for operating the levers to move the cups between gathering positions at the forehearths respectively and a discharging position over the said space, each gathering cup being equipped with a sealing plunger, means for raising and lowering the sealing plunger, a suction valve opened by the lowering of the sealing plunger and a compressed air valve opened by the raising of the sealing plunger.

10. Means for feeding charges of glass to glass forming machines comprising a pair of parallel furnace forehearths having a space therebetween, levers mounted over the forehearths, a pair of gathering cups supported by the said levers, means for operating the levers to move the cups to gathering positions at the forehearths respectively and a discharging position over the space between the forehearths, yieldable means adapted to be loaded during movement of a gathering cup into a gathering position and means for severing a charge of glass in the gathering cup from the glass in the forehearth, said last-mentioned means being actuated by the release of the yieldable means.

11. Means for feeding charges of glass to glass forming machines comprising a pair of parallel furnace forehearths having a space therebetween, levers mounted over the forehearths, a pair of gathering cups supported by the said levers, means for operating said levers to move the gathering cups to gathering positions over said forehearths respectively and means for severing a charge of glass in either of the gathering cups from the glass in the forehearths, said means including an angularly displaceable arm a member carrying a spring, means for compressing said spring operated by movement of one of the aforesaid levers and means connecting said arm and said member.

12. Means for feeding charges of glass to glass forming machines comprising a pair of parallel furnace forehearths having a space therebetween, levers mounted over the forehearths, a pair of gathering cups supported by the said levers, means for operating the levers to move the cups to gathering positions at the forehearths respectively and a discharging position over the space between the forehearths and means for circulating the glass in the said forehearths.

13. Means for feeding charges of glass to glass forming machines from a pair of forehearths comprising a pair of gathering cups and operating means for simultaneously moving one cup to a gathering position over one or the other of the forehearths and the other cup to a discharging position out of register with both forehearths.

14. Means for feeding charges of glass to glass forming machines from a pair of forehearths comprising a pair of gathering cups and operating means for simultaneously moving one cup to a gathering position at one forehearth and the other cup to a discharging position and alternately moving said one cup to a discharging position and said other cup to a gathering position at the other forehearth.

15. Means for feeding charges of glass to glass forming machines from a pair of forehearths comprising a pair of gathering cups arranged for movement over the forehearths respectively, and means for simultaneously moving one cup upwardly and laterally of the forehearths into a discharging position from a charging position at one forehearth and the other cup from said discharging position into a gathering position at the other forehearth.

16. Means for feeding charges of glass to glass forming machines comprising a pair of parallel furnace forehearths having a space therebetween, levers mounted over the forehearths, a pair of gathering cups supported by the said levers, means for operating the levers to move the cups to gathering positions at the forehearths respectively, and a discharging position over the space between the forehearths, and means for circulating the glass in the said forehearths, said means comprising paddles and means to impart a combined raising and lowering and oscillatory movement to said paddles.

17. Means for feeding charges of glass to glass forming machines comprising a pair of parallel furnace forehearths having a space therebetween, levers mounted over the forehearths, a pair of gathering cups supported by said levers, a rotating cam for oscillating the levers between two limiting positions at each of which one cup is in a discharging position out of register with both forehearths while the other is in a charging position over one or the other of the forehearths, means for circulating the glass in the said forehearths, said circulating means being operated by a rotary element operated synchronously with the said rotating cam.

18. Means for feeding charges of glass to glass forming machines from a pair of forehearths disposed in spaced relation and parallel with one another, comprising a pair of gathering cups and means for moving the cups alternately to a discharging position over the space between the forehearths from charging positions over the forehearths respectively.

19. Means for feeding charges of glass to glass forming machines comprising a pair of forehearths, a pair of gathering cups, a pair of vertically spaced horizontal pivots over the forehearths, a pair of parallel levers mounted on said pivots respectively, means connected to and forming a vertical link between the free ends of said levers and carrying said cups so that said means and cups are maintained vertical throughout their movements and means to operate said levers to move the cups to charging positions over the forehearths respectively or to discharge position out of register with both forehearths.

THOMAS COURTNEY MOORSHEAD.